United States Patent [19]

Plamthottam et al.

[11] Patent Number: 5,100,728
[45] Date of Patent: Mar. 31, 1992

[54] HIGH PERFORMANCE PRESSURE SENSITIVE ADHESIVE TAPES AND PROCESS FOR MAKING THE SAME

[75] Inventors: Sebastian S. Plamthottam, Pasadena; Earl W. McFeaters, La Crescenta; Yehuda Ozari, Arcadia; Prakash Mallya, Pasadena, all of Calif.

[73] Assignee: Avery Dennison Corporation, Pasadena, Calif.

[21] Appl. No.: 573,266

[22] Filed: Aug. 24, 1990

Related U.S. Application Data

[63] Continuation of Ser. No. 209,896, Jun. 22, 1988, abandoned, which is a continuation-in-part of Ser. No. 69,376, Jul. 1, 1987, Pat. No. 4,906,421.

[51] Int. Cl.⁵ ............................................. C09J 7/02
[52] U.S. Cl. ..................... 428/345; 428/354; 428/355
[58] Field of Search ............... 428/343, 345, 354, 347, 428/349

[56] References Cited

U.S. PATENT DOCUMENTS

| | | | |
|---|---|---|---|
| 4,223,067 | 9/1980 | Levens | 428/343 X |
| 4,330,590 | 5/1982 | Vesley | 428/345 X |
| 4,522,870 | 6/1985 | Esmay | 428/345 X |
| 4,599,265 | 7/1986 | Esmay | 428/345 X |
| 4,612,242 | 9/1986 | Vesley et al. | 428/343 X |
| 4,666,771 | 5/1987 | Vesley et al. | 428/325 |
| 4,748,061 | 5/1988 | Vesley | 428/40 |
| 4,818,610 | 4/1989 | Zimmerman et al. | 428/345 |

*Primary Examiner*—Jenna Davis
*Attorney, Agent, or Firm*—Christie, Parker & Hale

[57] ABSTRACT

A pressure sensitive adhesive tape comprises a carrier layer having a thickness of 0.25 to 2.0 millimeter and comprising an electron beam cured pressure sensitive adhesive matrix, 10 to 20% by volume low density microspheres and at least one pigment in an amount sufficient to color the tape. Preferably, fumed silica is present in an amount up to 5% by weight. The tape preferably has a kin layer on each side of the carrier layer. The skin layer has a coating thickness of 25 to 125 g/m² and comprises a pressure sensitive adhesive matrix free of rigid, low density microspheres. The process comprises first preparing an adhesive composition containing electron beam-curable adhesive polymer matrix, fillers and solvent. The composition is introduced and conveyed through a twin screw extruder. In the extruder, solvent is removed in one or more solvent removal units, and a solvent-free composition is extruded as the carried layer. Skin layers may be co-extruded with the carrier layer.

44 Claims, 3 Drawing Sheets

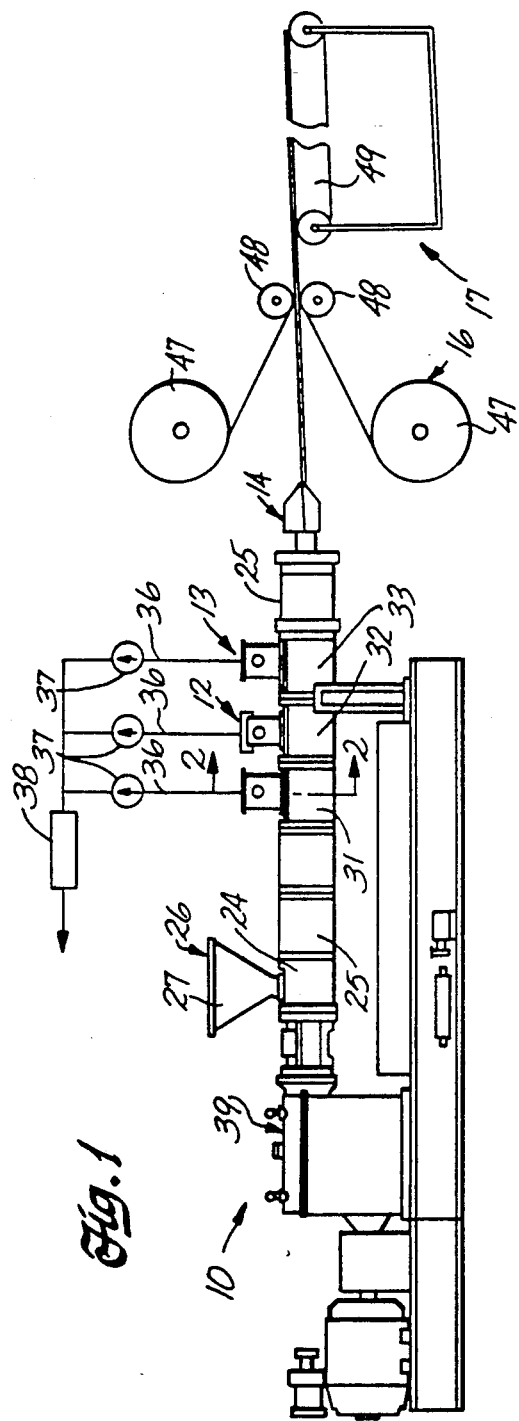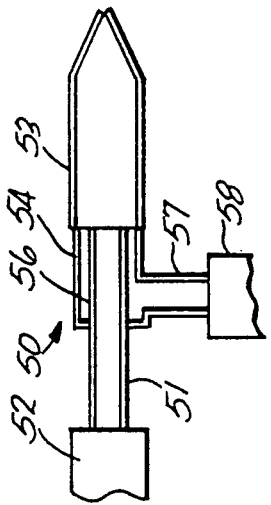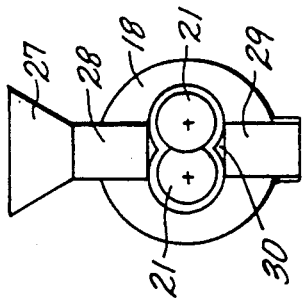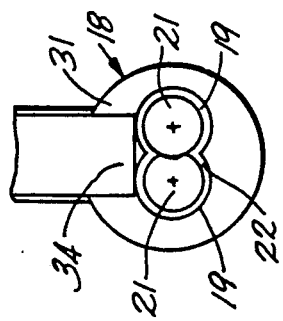

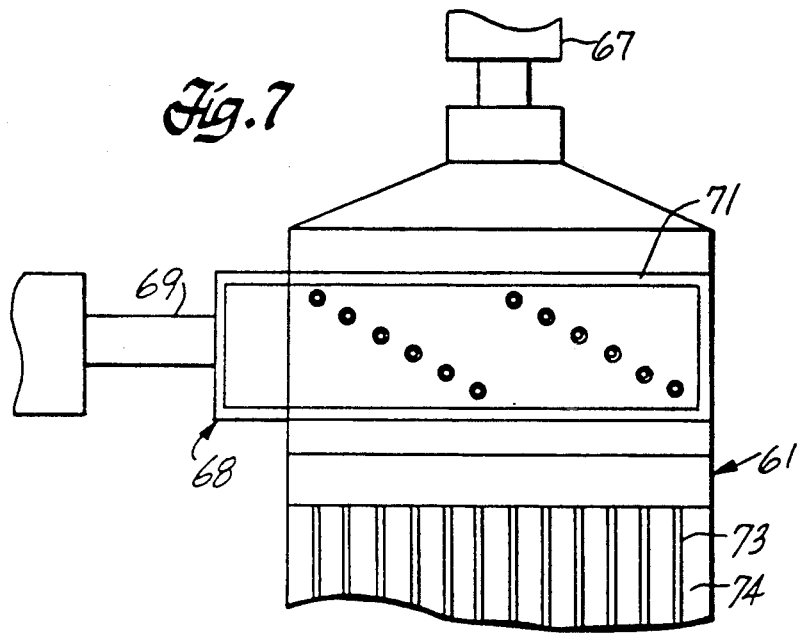
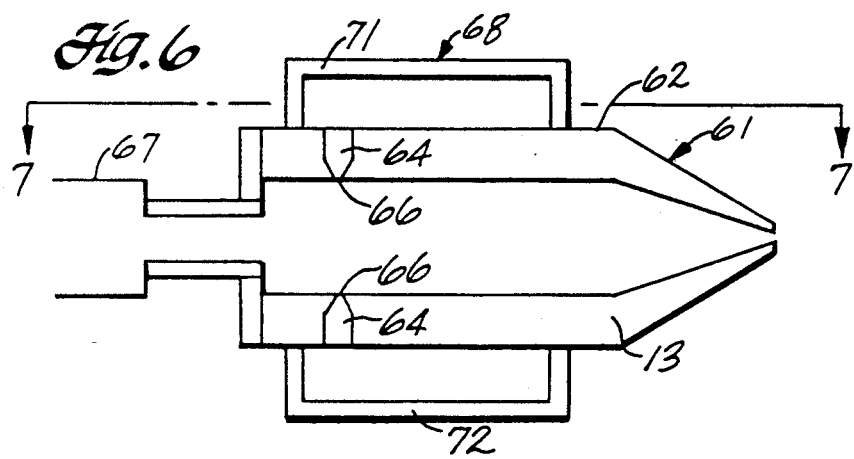
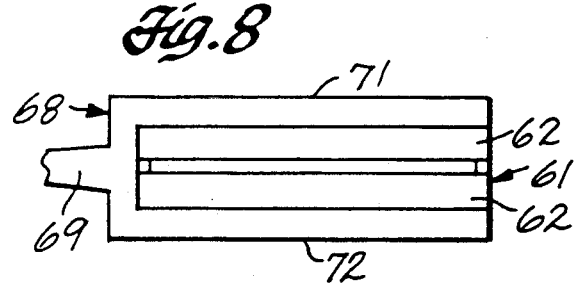

HIGH PERFORMANCE PRESSURE SENSITIVE ADHESIVE TAPES AND PROCESS FOR MAKING THE SAME

This is a continuation of Ser. No. 209,896, now abandoned which is a continuation-in-part of Ser. No. 069,376 now U.S. Pat. No. 4,906,421.

FIELD OF THE INVENTION

This invention relates to pressure sensitive adhesive tapes and more particularly to electron beam-cured double-coated acrylic and rubber based pressure sensitive adhesive foam-like tapes and a process for making such tapes.

BACKGROUND OF THE INVENTION

A variety of double-coated foam tapes are being used for structural bonding in certain applications replacing spot welds, tack welds, or rivets. Such applications include, for example, the bonding of side molding to automobiles, fiberglass body panels to motor homes, plexiglass inspection windows onto equipment cabinets, and the like. The foam layer of these tapes usually has a polymer matrix based on polyethylene, polyurethane, polyvinyl chloride, or polychloroprene. These tapes exhibit poor conformability around curved substrates.

U.S. Pat. No. 4,223,067 to Levens, assigned to Minnesota Mining and Manufacturing Co., describes a method for making conformable foam-like acrylic pressure sensitive adhesive tapes using on web-polymerization technology. In the process, a mixture of monomers and 20 to 65 volume percent glass microbubbles is coated onto a backing sheet and then polymerized to a pressure sensitive adhesive state. The polymerization may be initiated by ultraviolet light or less preferably by heat if the mixture includes a heat-activatible polymerization initiator.

The tapes disclosed by Levens are fairly elastic under briefly applied stresses but exhibit low elasticity under prolonged stress and therefore adhere to rough and uneven surfaces. These tapes exhibit high peel adhesion. The method of Levens, however, requires a long duration to complete polymerization. This makes the tapes expensive to produce. Moreover, coatings having a thickness greater than about 0.2 mm involving neat monomers tend to produce excessive bubbles. If ultraviolet light is used to accomplish polymerization, the composition must be UV transparent. This means that the composition must be free of coloring pigments, or other ultraviolet light absorbing fillers. Also, because the process requires the compositions to comprise a photoinitiator, the compositions tend to yellow over time.

U.S. Pat. No. 4,612,242 to Vesley et al., also assigned to Minnesota Mining and Manufacturing Co., indicated that the white color of the Levens tape, caused by the absence of pigment, made the tape undesirably visible in certain applications, but that the addition of carbon black in an amount sufficient to produce a desirable black appearance would block the ultraviolet radiation from polymerizing the mixture to a pressure-sensitive adhesive state. Vesley et al.'s solution to the problem was to coat the glass microbubbles with an inorganic film, e.g. silver, having a thickness that does not unduly inhibit polymerization.

While the method of Vesley et al. does impart some color to the tapes, it has certain drawbacks. It still takes a long time to effect polymerization, making the tapes expensive to produce. Moreover, glass microbubbles having an inorganic coating are expensive, adding to the cost of producing the tapes. Only a limited number of colors are available in this process.

SUMMARY OF THE INVENTION

The present invention provides a pressure sensitive adhesive (PSA) tape comprising at least one carrier layer having a composition comprising a cross-linked polymer matrix, preferably a cross-likined PSA polymer matrix, and more preferably, an electron beam-cured PSA polymer matrix. The carrier layer further comprises low density microspheres and at least one pigment. The carrier layer is preferably coated on each side with a skin layer having an adhesive polymer matrix free of rigid low density microspheres.

The polymer matrix of the carrier layer is preferably an acrylic based PSA polymer matrix or a rubber based PSA polymer matrix. The polymer matrix constitutes from 30% to about 90% by volume, preferably from about 55% to about 90% by volume and more preferably from about 70% to about 85% by volume of the carrier layer, the balance being made up of fillers.

The low density microspheres of the carrier layer are generally in the size range of from about 10 microns to about 300 microns and may be made of ceramic, polymeric, glass, carbon or other suitable material. Mixtures of such low density microspheres may be used. The low density microspheres may be solid, hollow or porous, rigid or elastomeric, and tacky or nontacky. The material of the low density microspheres, if desired, may be selected to cross-link with the polymer matrix during curing.

The low density microspheres are present in an amount of from about 5% to about 70% by volume of the carrier layer and preferably in an amount of from about 5% to about 45% by volume and more preferably in an amount of from about 10% to about 20% by volume of the carrier layer.

The pigment is present in an amount sufficient to impart the desired color to the tape. Pigment may be a solid inorganic filler such as carbon black, titanium dioxide or the like, or may be an organic dye.

Preferably, the carrier layer comprises fumed silica in an amount of up to about 5% by weight and more preferably in an amount of from about 1% to about 2% by weight.

The thickness of the carrier layer is not critical but is preferably in the range of from about 0.25 mm to about 4.0 mm and more preferably in the range of from about 0.25 mm to about 2.0 mm. The coating thickness of the rigid low density microsphere-free skin layers is preferably about 25 to about 125 grams/square meter.

The foam-like tapes of the present invention exhibit high conformability which arises from the low elastic memory of the carrier layer. The tapes also exhibit high failure strain, high cleavage peels and tensile adhesion, and good gasoline and moisture resistance. If inherently tacky PSA low density microspheres are used, the tapes also exhibit greatly improved cold temperature properties.

The invention further provides a process for rapidly producing curable bubble-free PSA tapes as described above in virtually any practical thickness. The adhesive sheet materials are produced from an adhesive composition containing from about 40% to about 80% solids, i.e., about 20% to about 60% by volume solvent. The "solids" portion of the adhesive composition comprises a curable adhesive polymer matrix and may comprise one or more fillers such as pigments, solid, hollow or porous low density microspheres and the like. The curable adhesive polymer matrix comprises one or more monomers which have been at least partially polymerized and preferably completely polymerized.

In the process, the adhesive composition is introduced into a twin screw extruder through an upstream feeding unit at the entrance of the extruder barrel. The rotating screws of the extruder convey the adhesive composition downstream through the extruder barrel from the feeding unit to a die at the downstream end of the extruder. At the downstream end, the adhesive composition exits the extruder through the die.

At one or more locations downstream of the feeding unit, the extruder comprises a solvent removal unit. The solvent removal unit comprises a barrel section having a vent opening. A conduit or duct encloses the vent opening and extends from the vent opening to a vacuum pump. The vacuum pump is arranged to reduce the atmospheric pressure within the duct, the vent opening and the barrel section to thereby draw off solvent present in the adhesive composition moving through that barrel section.

In the process, the temperature of the material passing through the barrel section of the solvent removal unit and the atmospheric pressure within the barrel section are adjusted to cause the solvent in the material to evaporate and be drawn off without drawing any of the adhesive composition through the vent opening. Elevated temperatures of from about 100° C. to about 160° C. in combination with an atmospheric pressure of from about 50 to about 100 torr are presently preferred.

In a preferred embodiment of the invention, the extruder is provided with two or more solvent removal units. Each solvent removal unit comprises a barrel section having a vent opening which is connected by a duct to a vacuum pump to reduce the atmospheric pressure within the barrel section. In an embodiment involving three solvent removal units, it is presently preferred that approximately 80% of the solvent in the composition is removed as the adhesive composition passes through the barrel section of the first solvent removal unit; an additional 18% to 19% of the solvent is removed as the adhesive composition passes through the barrel section of the second solvent removal unit; and another 1% to 2% is removed as the adhesive composition passes through the barrel section of the third solvent removal section.

After the solvent is removed, the adhesive composition preferably exits the die of the extruder onto a backing film or the like.

In a particularly preferred embodiment of the invention, there is provided a co-extrusion process for making a laminated PSA composition having at least one first layer, e.g. a carrier layer, of a particular first polymeric composition which may or may not be a PSA composition and at least one second layer, e.g. a skin layer, of second composition which is a PSA composition. The process utilizes two twin screw extruders, each having one or more solvent removal units as described above. A first mixture comprising the first composition and solvent is introduced into the first extruder. Simultaneously, a second mixture comprising the second composition and solvent is introduced into the second extruder. In each extruder, the solvent is stripped by the solvent removal unit, and the composition is passed into a single sheet die from which the laminated PSA sheet material is extruded.

BRIEF DESCRIPTION OF THE DRAWINGS

These and other features and advantages of the present invention will be better understood by reference to the following detailed description when considered in conjunction with the accompanying drawings wherein:

FIG. 1 is a longitudinal, cross-sectional view of an extruder useful in the practice of the present invention;

FIG. 2 is a transverse cross-sectional view of the extruder taken through lines 2—2;

FIG. 3 is a transverse cross-sectional view of the barrel showing an alternatively preferred feed unit;

FIG. 5 is a fragmentary cross-sectional view showing an adaptor for extending a laminated PSA sheet.

FIG. 6 is a fragmentary cross-sectional view of a preferred die assembly.

FIG. 7 is a top cutaway view of the die assembly of FIG. 6 taken along lines 7—7.

FIG. 8 is a front view of the die assembly of FIG. 6.

DETAILED DESCRIPTION OF THE INVENTION

Figure 4:
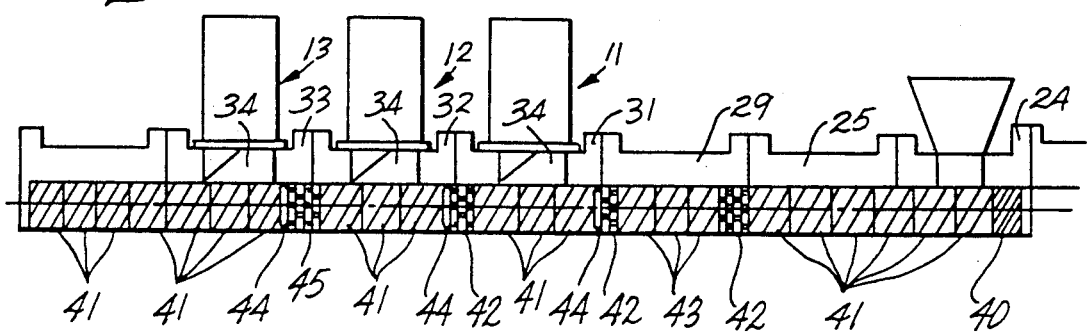
FIG. 4 is a schematic view of the extruder barrel showing the screw profile.

In a particularly preferred embodiment of the present invention, there is provided a foam-like double-coated PSA tape having excellent conformability, high failure strain, high cleavage peels and tensile adhesion, and good solvent resistance. The double-coated PSA tape is a composite structure comprising a middle carrier layer and a skin layer on each side of the carrier layer.

The thickness of the carrier layer is not critical but is preferably from about 0.25 mm to about 4.0 mm and more preferably from about 0.25 mm to about 2.0 mm. Likewise the coating thickness of the skin layer is not critical but is preferably in the range of from about 25 g/m$^2$ (approximately 1 mil) to about 125 g/m$^2$ (approximately 5 mils).

Carrier layers having a thickness greater than about 4.0 mm are not preferred because they contain excess material which is generally not needed for most applications. Further, thicker carrier layers tend to be more visible in a particular application and are therefore not generally preferred because they are less aesthetically pleasing. Such carrier layers also require higher voltages for electron-beam curing. Carrier layers having a thickness less than about 0.25 mm are not preferred because they tend to exhibit insufficient conformability and thus are less suitable for use with irregular surfaces. Thicknesses in the range of about 0.25 mm to about 2.0 mm are suitable for most applications.

The skin layers typically exhibit better adhesion than the carrier layer and thus enhance the overall adhesion of the tape. Skin layers having a coating thickness less than about 25 g/m$^2$ are not preferred because no significant benefit is seen. Skin layers having a coating thickness greater than about 125 g/m$^2$ are not preferred because no additional benefit is seen with greater thickness.

In accordance with the invention, the carrier layer comprises a cross-linked polymer matrix, low density microspheres, and at least one colored pigment. The polymer matrix is preferably an acrylic based PSA polymer matrix or a rubber based PSA polymer matrix. Cross-linking is preferably accomplished by electron-beam curing.

Acrylic-based PSA polymer matrices generally comprises one or more first monomers, which if homopolymerized, would have a glass transition temperature of less than about −25° C. based on the total weight of the monomers. Examples of such monomers include alkyl acrylates such as butylacrylate, propylacrylate, 2-ethyl hexylacrylate, isooctyl acrylate, isodecylacrylate, and the like. The balance of the monomer system may be comprised of second monomers which, if homopolymerized, would have a glass transition temperature greater than −25° C., normally greater than about 10° C. Among such monomers there may be mentioned ethyl acrylate, alkyl methylacrylate such as methyl methacrylate, ethyl methacrylate, butyl methacrylate and the like; co-polymerizable vinyl-unsaturated monomers such as vinyl acetate, vinyl propionate and the like; and styrenic monomers such as styrene, methyl styrene and the like, unsaturated carboxylic acids such as acrylic acid, methacrylic acid, itaconic acid, fumaric acid, and the like; acrylamide, vinyl caprolactam and the like. Suitable polymers are described, for example in co-pending U.S. Pat. application Ser. No. 916,717, which is incorporated herein by reference.

Rubber-based PSA polymer matrices useful in the practice of the present invention may be formulated as solvent, hot melt, or emulsion, with holt melt or solvent based adhesives presently being preferred. The PSA matrices employed are normally based on di-block and tri-block polymers and mixtures thereof. Other resin-modified elastomers could be used. The matrix polymer, to be functional, should have a net effective glass transition temperature of from about 15° C. to about 70° C. below the use temperature, preferably from about 35° C. to about 70° C. below the use temperature. Rubber based adhesive suitable for use in the present invention are described in U.S. Pat. Nos. 3,239,478 to Harlan, 4,152,231 to St. Clair, et al., 3,676,202 to Korpman, 3,783,072 to Korpman, 3,932,328 to Korpman and 4,028,292 to Korpman and partially in U.S. Pat. application Ser. No. 896,127, all of which are incorporated herein by reference.

It is preferred that the polymer matrix of the carrier layer be a PSA polymer matrix. It is understood, however, that other materials may be used as the polymer matrix. Non-PSA polymers suitable for use as the polymer matrix of the carrier layer include polyethylene, ethylene propylene rubbers, neoprene, butyl rubber and the like.

Cross-linking of the polymer matrix is preferably accomplished by electron-beam curing. Accordingly, it is understood that other electron beam curable polymer materials such as electron beam curable silicones, may also be used, if desired.

While not presently preferred, other suitable methods for curing the polymer matrix may be used. For example, if the polymer matrix comprises a heat-activatable cross-linking agent, curing by the application of heat may be used. If the polymer matrix also contains a microwave absorbing agent, microwave radiation may be used to effect curing. Because of the presence of pigment in the polymer matrix, ultra-violet radiation is not an appropriate method for curing the polymer matrix of the present invention.

The polymer matrix is present in the carrier layer in an amount of from about 30% and preferably from about 55% to about 90% by volume, and more preferably in an amount of from about 70% to about 85% by volume. Stated in another way, the total amount of fillers should be at least 10% by volume and no more than about 70%, and preferably no more than about 45% by volume, and more preferably in the range of from about 15% to about 30% by volume. Carrier layers having more than about 45 volume percent fillers, or more than about 70 volume percent fillers, if very low density fillers, e.g., penolic hollow microspheres, are used, tend to exhibit low elongation and high modulus and not generally suitable for PSA applications. Likewise, carrier layers having less than about 10% by volume fillers are not preferred because the resultant tapes generally possess too low of a modulus.

Carrier layers having from about 15 to about 30 volume percent fillers are most preferred because such compositions tend to exhibit the best combination of properties such as elongation and tensile strength.

The carrier layer also comprises from about 5% to about 70% by volume, preferably 5% to about 45% by volume, and more preferably from about 10% to about 20% by volume low density microspheres. The low density microspheres tend to reduce the density of the carrier layers, generally improve peel adhesion and thereby improve conformability and also improves the strength properties, i.e. the combination of elongation and tensile strength of the layer.

The low density microspheres may be solid, hollow or porous and rigid or elastomeric. The low density microspheres may be made of any suitable material including glass, ceramic, polymeric and carbon materials.

Polymeric low density microspheres may be made of rigid materials or elastomeric materials. Suitable rigid polymeric materials include thermosetting polymers, e.g., phenolic polymers, or thermoplastic polymers, e.g., polyvinylidene chloride acrylonitrile copolymers (PVDC copolymers). It is expected that thermoplastic polymer microspheres will cross-link and graft to the polymer matrix when electron-beam radiation is used to cure the polymer matrix. By cross-liking the low density microspheres and grafting to the polymer matrix, properties such as tensile strength could be improved.

Preferred elastomeric low density microspheres are made of a PSA material and exhibit a very low glass transition temperature (Tg), are infusible, insoluble and inherently tacky. Such elastomeric low density microspheres can be made, for example, by suspension polymerization as disclosed in U.S. Pat. Nos. 3,691,140 to Silver, 3,857,731 and 4,166,152 to Baker et al., and 4,495,318 to Howard, and U.S. Pat. application Ser. No. 138,509, all of which are incorporated herein by reference.

Infusible low density microspheres disclosed in U.S. Pat. Nos. 4,735,837, 4,049,483, 4,645,783, 4,624,893, 4,636,432, 4,598,112, Japanese Patent No. 61258854, all of which are incorporated herein by reference, are also suitable for use in the present invention.

It has been found that the incorporation of elastomeric low density microspheres in the carrier layer improves the low temperature performance of the foam tapes of the present invention, particularly in cold slam tests, e.g., Fisher Body Materials Testing (FBMT) 45-89, at temperatures of, for example, −20° C. and −30° C.

As used herein, "low density microspheres" include rigid microspheres having a density of less than about 1.0 g/cc and elastomeric microspheres having a density of less than about 1.5g/cc. Accordingly, rigid microspheres made of glass, ceramic or other material and having a density greater than about 1.0 g/cc and elastomeric microspheres having a density greater than about 1.5g/cc are not preferred. Such high density microspheres tend to adversely increase the density of the carrier layer requiring higher electron-beam voltages for curing.

Hollow microspheres, which are generally available in a wide variety of densities and crush strengths, are presently preferred. Ceramic hollow microspheres are particularly preferred because they exhibit high crush strength and tend to be less expensive than glass, polymeric or carbon hollow microspheres.

The size, i.e., the average diameter, of the low density microspheres is preferably from about 10 to about 300 microns. Low density hollow microspheres having a diameter less than about 10 microns may be suitable but are not presently commercially unavailable for evaluation.

Low density hollow microspheres having an average diameter greater than about 300 microns are not preferred at the present time due to a lack of commercial availability and because they are expected to exhibit a undesirable low crush strength.

If the carrier layer comprises rigid, low density microspheres made of, for example, glass or ceramic having a density of from about 0.2 to about 1.0 g/cc, it is preferred that the loading of low density microspheres not exceed about 45% because carrier layers with higher loadings tend to exhibit very low elongation. If low density rigid microspheres having a density less than about 0.2g/cc, e.g., hollow phenolic microspheres, are used, the loading may be as high as about 70% by volume. If low density elastomeric microspheres are used, loadings as high as about 70% by volume may be used.

Carrier layers having less than about 5 volume percent low density microspheres of any kind are not preferred because the benefit of the low density microspheres is insufficiently realized, e.g., the peel and shear adhesion tends to be too low. Moreover, the density of the carrier layer increases as the volume loading of the low density microspheres decreases, and thus, low loadings requires a higher electron beam voltage for curing. Consequently, such carrier layers tend to be more expensive to produce. Volume loadings between about 10% to about 20% are most preferred because carrier layers having such loadings tend to exhibit the optimum combination of elongation and tensile strength and other physical properties. Particularly preferred carrier layers have from about 15.0% to 20.0% by volume low density microspheres.

At least one pigment is present in the composition to give color to the tape. Solid particulate pigments tend to improve strength characteristics, i.e. increase the tensile strength and reduce the elongation of the tape. As used herein, the term "pigment" refers to any coloring agent compatible with or dispersible in the polymer matrix. The pigments may be solid particles such as carbon black and other particulate pigments or titanium dioxide or organic dyes such as phthalocyanine green sold by American Hoechst or 2915 dianisidine orange sold by Harshaw Chemical. The particular type of pigment used will depend upon the color desired. For example, carbon black may be used if the desired color is black. Titanium dioxide may be used if the desired color is white.

The particle size range and the loading of the pigment depends on the type of pigment utilized. For carbon black, a loading of up to about 5% by weight may be used. Loadings above 5% by weight are not preferred because carbon black tends to decrease the elongation at break. Loadings as low as about 0.25% by weight are found to be sufficient to impart a suitable black color to the tape. With respect to carbon black, any suitable commercially available carbon black may be utilized. A particularly preferred carbon black is Monarch 700 carbon black, manufactured by Cabot Corporation.

In addition to the low density microspheres and pigment, it is preferred that the carrier layer comprise a filler such as fumed silica. Fumed silica lowers the elongation and increases the tensile strength of the carrier layer. Accordingly, the preferred amount of fumed silica is selected to provide the best balance of high elongation and high tensile strength. The fumed silica could be replaced by carbon black, if desired.

The fumed silica is preferably present in an amount of up to about 10% by weight of the carrier layer. Loadings greater than about 10% tend to result in a carrier layer which is too stiff and insufficiently conformable for most applications. Volume loadings of from about 3% to about 5% by weight have been found to impart the best combination of tensile strength and elongation and are hence presently preferred.

Small, rigid high density solid microspheres having a density greater than 1.0 g/cc and a size or average diameter of less than about 10 microns and preferably from about 0.1 to about 5 microns may be used as an alternative to or in combination with fumed silica to lower the elongation and increase the tensile strength of the carrier layer. The small, rigid, high density solid microspheres may be present in an amount of up to about 5% by weight. Above about 5% by weight, the carrier layer tends to become too stiff. It is presently preferred that the small, rigid, high density solid microspheres be present in an amount of from about 1% to about 2% by weight.

It is understood that the preferred loadings of the various above-mentioned fillers are dependent upon the precise characteristics which are sought and on the amounts of the other fillers present in the carrier layer. For example, a relatively high loading of solid fillers, e.g., fumed silica or small, rigid, high density microspheres may be preferred if the loading of low density microspheres is low. Lower loadings may be preferred if the amount of microspheres is high.

It is further understood that many other fillers, e.g., calcium carbonate, china clay, etc., may be incorporated into the carrier layers as desired.

The skin layers are preferably unfilled layers of an adhesive polymer matrix or, less preferably, may be an adhesive polymer matrix filled with pigment. The skin layer contains no low density microspheres. The polymer matrix of the skin layer may be any polymer matrix which exhibits good adhesion with the carrier layer. Preferred adhesive polymer matrices include PSA polymer matrices and heat activatable adhesive polymer matrices.

The carrier layers of the present invention may be prepared by any suitable method. For example, a mixture of the polymer matrix, fillers and solvent may be coated onto a backing film to a desired thickness. The solvent is then removed by drying before curing. Alternatively, a mixture comprising the polymer matrix and fillers and without solvent may be extruded as such a sheet or the like. A calendaring process may also be used.

In a particularly preferred process, the carrier layer is made by first preparing an adhesive composition containing the polymer matrix, solvent for the polymer matrix and the desired fillers. The composition is introduced into an extruder and conveyed through the extruder by the rotating screws. While in the extruder, the solvent is removed by vacuum evaporation in one or more solvent removal units. An essentially solvent-free composition is then extruded from the extruder. As used herein, "solvent-free" means a composition having less than about 2% by volume solvent.

Exemplary solvents include ethyl acetate, isopropanol, ethanol, hexane, heptane and toluene. The purpose of the solvent is to reduce the viscosity of the composition so that it may be easily handled in bulk, e.g., readily poured from one container to another. An amount of solvent sufficient to reduce the viscosity to less than about 100 pascal-seconds is presently preferred. For most compositions, an amount of solvent that provides a solids content of from about 40% to about 80% is sufficient for this purpose. That is, compositions having more than about 80% solids are not preferred because the viscosity remains undesirably high. Compositions having less than about 40% solids are not preferred because they contain excess solvent, i.e. more than enough solvent to reduce the viscosity to an easily workable level, and the excess solvent must be removed in the process. The particular viscosity desired will depend on the method by which the composition is introduced into the extruder.

The particular amount of solvent required to achieve a desired viscosity will depend on the temperature of the composition. Accordingly, the composition is preferably heated to minimize the amount of solvent required to achieve the desired viscosity which, in turn, minimizes the amount of solvent that has to be removed in the process. Temperatures slightly below the boiling point of the composition are preferred.

With reference to FIG. 1, there is shown schematically an apparatus suitable for use in practicing the present invention. The apparatus comprises a twin screw extruder 10 with three solvent removal units 11, 12, and 13 for removing solvent from an adhesive composition traveling through the extruder 10. A sheet die 14 is mounted at the downstream end of the extruder 10. In such an arrangement, a solventfree adhesive composition may be extruded in the form of a sheet.

In the embodiment shown, a backing film or web feeding unit 16 is provided for applying a release film to one side of the extruded sheet. A conveying unit 17 is also shown for carrying the extruded sheet material away from the extruder 10. It is understood that the processing of the extruded sheet, e.g., application of a backing film conveying away from the extruder, subsequent curing, etc., may be accomplished by any suitable conventional method. Subsequent curing by electron beam radiation is currently preferred.

The twin screw extruder 10 may be any suitable commercially available twin screw extruder which is modified to include one or more solvent removal units. For example, extruders manufactured by Berstorff Corporation of West Germany, have been found to be suitable for use in the practice of this invention.

With reference to FIG. 2, the extruder 10 comprises a housing or barrel 18 having a pair of side-by-side generally parallel and cylindrical overlapping bores 19 forming a barrel chamber 22, in which a pair of corotating intermeshing screws 21 are mounted. While it is presently preferred that the extruder 10 have corotating screws 21, it is understood that extruders having counter-rotating screws may also be used. It is also understood that arrangements in which the screws do not intermesh can also be used. For compositions involving breakable low density microspheres, e.g, hollow glass microspheres, use of tangential screws may reduce breakage of the microspheres.

The barrel 18, preferably comprises multiple sections. The combination and arrangement of barrel sections are selected to accomplish specific tasks. The barrel sections may completely enclose the screws or have openings for feeding, venting and the like. Each section of the barrel is provided with a heating means so that the material within that barrel section may be heated to a desired temperature.

Likewise, the screws 21 preferably comprise multiple elements designed to accomplish the particular tasks such as mixing, conveying, building pressure and the like. The combination and arrangement of screw elements are selected to accomplish desired tasks in a particular order.

In the embodiment shown, the barrel 18 comprises seven sections. The first section 24 is part of a feeding unit 26 for introducing material into the extruder. The feeding unit 26 comprises a large feed hopper 27 which empties directly into the chamber 22 of the first barrel section 24 through an entrance port 28, as shown in FIG. 3. While not shown in the drawing, a feeding or metering unit may be provided at the entrance port 28 to control the rate of flow of material from the hopper 27 into the barrel 18.

It is understood that, rather than mixing the fillers, polymer matrix and solvent together and then introducing the mixture into the extruder, one or more of the fillers can be introduced separately. If added separately, it is preferred that the filler be added to composition already in the barrel. This provides mixing between the polymer matrix and the filler and reduces clumping and possible crushing of the filler by unwetted screws. As an example, the composition comprising polymer matrix and solvent may be introduced in a first feed unit at the first barrel section and the solid fillers may be introduced in a second downstream feed unit.

Alternatively, the filler and the composition comprising polymer matrix and solvent may be added in the same barrel section in an arrangement as shown in FIG. 3. In such an arrangement, the composition comprising polymer matrix and solvent is introduced into the barrel chamber 22 through an entrance port 29 at the bottom of the barrel 18. The composition thus introduced tends to puddle at the saddle area 30 of the barrel 18 wetting the screws 21 as they rotate. The filler is introduced into the extruder at the top of the barrel 18, for example through the feed hopper 27, directly onto the wetted screws.

If the separately added solid filler comprises breakable low density microspheres, e.g., hollow glass microspheres, it is presently preferred to add the filler at the downstream end of the extruder, i.e., at a location downstream from the solvent removal units, to reduce breakage of the low density microspheres. In such an embodiment, the screws, if desired, may be intermeshing through the solvent removal units to enhance devolatization of the adhesive composition and then become tangential at the downstream and of the extruder where the breakable low density microspheres are added.

The first, second, and third solvent removal units 11, 12, and 13 are located downstream of the feeding unit at the fourth, fifth and sixth barrel sections 31, 32, and 33 respectively. As shown in FIG. 2, each of the fourth, fifth and sixth barrel sections 31, 32 and 33 has a large vent opening 34 at the top of that barrel section. A duct 36 extends from the vent opening 34 to a vacuum pump 37 for reducing the atmospheric pressure within the duct 36, vent opening 34 and that barrel section. In the embodiment shown, each solvent removal unit has a separate vacuum pump. It is understood that two or even three ducts may be joined so that only one or two vacuum pumps are required to reduce the atmospheric pressure in all three solvent removal units. Solvent removed is preferably collected, for example by condenser 38.

With reference to FIG. 4, there is shown a preferred screw profile suitable for use in the present invention. In the first barrel section 24, the screws 21 have a return scroll element 40 which prevents material from back flowing into the drive unit 39 (FIG. 1). The portions of the screws 21 extending through the remainder of the first barrel section 24, where the material is introduced into the extruder 10, and the second barrel section 25, comprise open chamber conveying elements 41 which rapidly transport the material downstream. Conveying elements 41 have very thin flights and therefore tend not to generate a significant amount of back pressure.

In the third barrel section 29, the screws 21 are designed to build pressure. In the embodiment shown, this is accomplished with a series of mixing elements 42 followed by closed chamber conveying elements 43 having large, thick flights. The conveying elements 43 are followed by another series of mixing elements 42 and then a blister 44. The blister 44 has a large diameter to restrict the flow of material past it.

Material which has squeezed past the blister 44 is conveyed rapidly through the fourth barrel section 31 and past vent opening 34 by a series of open chamber conveying elements 41. Such an arrangement maximizes the surface area of the material traveling through the fourth barrel section 31 and hence maximizes the removal of solvent by the first solvent removal unit 11.

At about the beginning of the fifth barrel section 32, before the next vent opening 34, the screws 21 comprise another series of mixing elements 42 followed by another blister 44.

In the present process, the blisters 44 may all be the same size, there being less of a need to increase the size of downstream blisters because the material becomes more viscous as it travels through the extruder. As material becomes more viscous it tends to build pressure in the extruder more readily. This tends to be the opposite of most extruding processes in which solid materials are fed into the extruder and the viscosity of the material decreases as it becomes hotter.

Material squeezing past the blister 44 is again carried rapidly past the vent opening 34 by open chamber conveying elements 41. Again, the arrangement maximizes the surface area of the material exposed to the atmosphere in the fifth barrel section 32 and hence maximizes solvent removal.

A similiar arrangement of screw elements is provided in the sixth barrel section 33 except that kneading elements 45 are preferably used rather than mixing elements 42. The kneading elements in combination with a blister build pressure similar to the mixing elements and blister but also tend to remove any last traces of air bubbles in the composition. In the seventh barrel section 35, the screw 21 comprises open chamber conveying elements 41 which convey the material to the die.

The above screw profile provides an arrangement wherein back pressure is built up before each vent opening and then released as the material travels past the vent opening 34 to expose as much of the composition as possible to the atmosphere. While such an arrangement is presently preferred, it is understood that other arrangements may be used. It is also understood that other screw elements may be used to provide the desired pressure changes with the extruder.

The screw profile is preferably designed to maximize the surface area of the composition passing through the barrel sections of the solvent removal units. In addition to the surface area, solvent removal is dependent on the temperature of the composition, the atmospheric pressure within that barrel section and the residence time of the composition within that barrel section which, in turn, depends on the feed rate.

For a given feed rate, temperature and pressure are adjusted to maximize solvent removal without drawing any of the composition through the vent opening. Elevated temperatures in the range of from about 80° C. to about 150° C. in combination with pressures of from about 50 torr to about 150 torr are presently preferred.

In the embodiment shown in FIG. 1, material is extruded as a thin sheet directly onto backing films or webs. Rolls 47 of backing film are mounted above and below the sheet die 14 of the extruder 10. The thin sheet of material and the film from the rolls 47 pass between a pair of small rollers 48 and extend across a conveyor 49 which carries the sheet material away from the extruder 10 for curing.

One of the surprising results of the present process is that the extruded sheets exhibits a lower-than-expected free monomer level. In conventional drying processes, the residual free monomer level is about 0.5 to 2%. Moreover, the residual free monomer level tends to substantially increases as the thickness of the sheets increases. In many applications, particularly medical applications, such free monomers are considered undesirable impurities. In the present process, a residual free-monomer level of 0.1% and below can be achieved. Accordingly, products made by the present invention would offer distinct advantages in such applications.

Another surprising result is that, even at thicknesses as great as 1mm or more, the extruded sheet is bubble free.

It is apparent that the number of solvent removal units may vary. That is, a single solvent removal unit may be used in certain applications, particularly those which do not require a solvent-free extrudate. Alternatively, many solvent removal units may be used, for example, if it is desired to achieve a very low solvent or residual monomer level.

It is apparent that other compounding ingredients, such as plasticizers, tactifying resins, fillers, cross-linking agents and the like may be added to the extruder to mix with the adhesive composition.

The present process may also be utilized in a co-extrusion process to co-extrude thin unfilled adhesive skin layers over both sides of the carrier layer. Such a process utilizes two twin screw extruders. Each of the extruders are set up generally as described above and comprise at least one feeding unit and at least one solvent removal units. However, both extruders feed material into a single die through an adaptor.

With reference to FIG. 5, there is shown an adaptor 50 suitable for such an application. The adaptor 50 comprises a first pipe 51 extending forwardly from the first extruder 52 to the back of a sheet die 53 for carrying material from the first extruder 52 to the die 53. A larger diameter second pipe 54, having a closed rearward end 55 is mounted concentrically around the first pipe 51 adjacent to the die 53. The diameter of the second pipe 54 is selected to form an annular space 56 around the first pipe 51. A third pipe 57 connects the second extruder 58 to the second pipe 54 and carries material from the second extruder 58 to the annular space 56. Both of the first and second pipes 51 and 54 open into the interior of the die 53.

In the process, a first composition comprising first polymer matrix, solvent and fillers, as required for forming the carrier layer, is introduced into the first extruder 52. Simultaneously, a second adhesive composition comprising second polymer matrix, e.g., a PSA polymer matrix, and solvent is introduced into the second extruder 58. Solvent is removed from each composition by the solvent removal units of the extruders as described above. A solvent-free first composition from the first extruder 52 flows into the die through the first pipe 51. Likewise, solvent-free second adhesive composition from the second extruder 58 flows through the third pipe 57 and then the second pipes 54 and into the die as a concentric ring around the first adhesive composition. In the die, the adhesive compositions are flattened out and extruded in a laminated sheet construction, the first adhesive composition forming a middle carrier layer and the second adhesive compositions forming the top and bottom skin layers.

The skin layer increases the tack or initial adhesion of the tape. As an alternative to co-extruding a skin layer covering the entire carrier layer, the skin layer may be "co-extruded" with the carrier layer as strips or patches at the surface of the carrier layer.

With reference to FIGS. 6, 7 and 8, there is shown a preferred die assembly for co-extruding one adhesive material with strips of a second adhesive material on its surface. The die assembly comprises a conventional sheet die 61. The top and bottom plates 62 and 63 of the die 61 comprise a series of cylindrical bores 64. A small opening 66 connects each bore 64 with the interior of die 61.

The material of the carrier layer is processed through a first extruder 67 having solvent removal units as described above and is introduced into the back of die 61. The second material, e.g., a PSA polymer matrix free of microspheres and filler, is introduced into the die through an adaptor 68. The adaptor 68 comprises a pipe 69 and upper and lower manifolds 71 and 72. The upper and lower manifolds 71 and 72 cover the bores 64 in the top and bottom plates 62 and 63 of the die 61.

The second material is introduced into the pipe 69, flows into the upper and lower manifolds 71 and 72, into the bores 64 and through the openings 66 into the interior of the die. In such an arrangement the second adhesive is "co-extruded" with the carrier material as strips 73 on the surface of the extruded carrier material 74. The width of the strips 73 depends on the diameter of the openings 66. Likewise the depth of the strips depends on the rate at which the second material is introduced into the die through the openings. If desired, the second material may be pulsed into the die, thus forming broken strips or patches of the second material at the surface of the carrier material. It is apparent that the outer surface of the strip 73 is generally coplanar with the exposed surface of the carrier material 74.

This embodiment offers more latitude in selecting the second material than a co-extrusion process in which the second material forms a skin layer covering the entire surface of the carrier layer. With a skin layer covering the entire surface, the materials of the skin and carrier layers must exhibit good adhesion to each other to prevent delamination. Formation of a skin layer comprising strips makes that requirement less critical because here is greater contact area between the second material and the carrier material. Also, if the carrier layer comprises a PSA polymer matrix, a substantial amount of the surface of the carrier layer is exposed and thus able to form a permanent bond with the substrate to which it is applied.

The second material may be processed in a second extruder as described above and introduced into pipe 69 from the second extruder. Alternatively, if the second material is an acrylic or rubber based hot melt adhesive or the like, it may be introduced into the pipe 69 by means of a gear pump or the like. Hot melt adhesives are presently preferred as they eliminate the need for a second extruder.

If desired, the backing film may be extruded simultaneously with the adhesive sheet and applied directly to the surface of the adhesive sheet. Also, rather than a co-extrusion process as described above, it is apparent that the tape and backing film may be co-extruded using a conventional blow film extrusion process.

For certain substrates such as PVC side moldings, the foam-like tape may be co-extruded with the substrate in a single operation.

The foam-like tape sheet or tape thus produced is preferably cured, i.e. cross-linked, by electron beam radiation. The carrier layer may be cured prior to or after lamination of the skin layers. Typical electron beam radiation levels range from about 10 to about 100 kiloGray (kGy) and are preferably from about 30 to about 60 kGy.

The foam-like tapes of the present invention exhibit an excellent combination of rheological, adhesion and performance properties. For acrylic based PSA tapes, tensile strength, as measured by ASTM D1708, is typically in the range 0.5 to 1.3 megapascal. Elongation, as measured by ASTM D1708, is preferably from about 500 to about 1500 percent or greater. For rubber based PSA tapes, the tensile strength is typically from about 0.7 to about 2.0 megapascals and the elongation is from about 500 to about 2500%.

For the acrylic based PSA tapes of the present invention, the storage modulus (G'), measured at 0.01 radians frequency at 25° C. is at least $10^4$ pascals and preferably at least $4 \times 10^4$ pascals after electron beam curing. The loss modulus (G") generally measured at 0.01 radians frequency at 25° C. is at least $10^4$ pascals and preferably at least $4 \times 10^4$ after electron beam curing. When measured at 100 radians frequency, G' and G" are both less than about $2 \times 10^6$ pascals.

The peel adhesion is preferably from about 1300 to about 3000 Newtons/m or greater for acrylic based PSA tapes and from about 3000 to about 12000 Newtons/meter or greater for rubber based PSA tapes measured by PSTC No. 3. In the test one side of the tape is laminated to soft 0.05 mm aluminum foil and then tested laminating the other side to the substrate with a 6.8 kg roller, two passes, and then waiting for twenty minutes. If the peel adhesion is greater than 350° Newtons/meter, a 5 mil polyester film is used rather than aluminum foil.

The shear adhesion as measured by Fisher Body Materials Specification (FBMS) Test Method (TM) 45-124, is preferably at least 500 grams for acrylic PSA tapes.

In the following examples, certain designations and trade names are used. Adhesive A is an electron beam curable acrylic solution adhesive comprising butyl acrylate, 2-ethyl hexyl acrylate and acrylic acid in a 45:41:19 mole ratio. Adhesive B is an electron beam curable acrylic solution adhesive comprising butyl acrylate, 2-ethyl hexyl acrylate and acrylic acid. RB designates a rubber based solution adhesive comprising about 19.3% by weight styrene-butadiene-styrene linear copolymer containing about 31% styrene, about 16.1% by weight styrene-butadiene copolymer, about 25.8% by weight alpha pinene tackifier, about 32.3% by weight rosin ester tackifier, and about 6.4% by weight of a compatible aromatic liquid resin. A-16-500 designates hollow glass microspheres marketed by Minnesota Mining and Manufacturing Co. having a true particle density of about 0.2 g/cc and a size of 20-130 microns. Q-cel 500 designates hollow glass microspheres marketed by P.Q. Corp. having a true particle density of about 0.2 g/cc and a size of 10 to 115 microns. Cab-O-Sil M5 designates fumed silica from Cabot Corp. Monarch 700 carbon black is sold by Cabot Corp. BJO 0930 is a trade designation of Union Carbide Corp. for hollow phenolic microspheres having an average particle size of 40 microns. SF-14 is a trade designation of PA Industries for hollow ceramic microspheres having a density of 0.7g/cc and a particle size of 10-100 microns.

EXAMPLE I

The following compositions listed in Table I were prepared by adding the fillers to a solution of the polymer in ethylacetate/isopropanol at 50% by weight solids:

TABLE I

| | Composition 1 | Composition 2 | Composition 3 | Com. 4 | Com. 5 |
|---|---|---|---|---|---|
| Adhesive A (dry wt.) | 100 g | 100 g | — | 100 | 100 |
| Adhesive B (dry wt.) | — | — | 100 g | — | — |
| Glass Hollow Microspheres A-16-500 | 6 g | 6 g | 6 g | — | — |
| Q-Cel-500 | — | — | — | — | 4 g |
| Cab-O-Sil M5 | 4 g | 3 g | 4 g | 4 g | 4 g |
| Carbon Black Monarch 700 | — | 1 g | — | — | 0.2 g |
| Phenolic Hollow Microsphere BJO 0930 | — | — | — | — | 2 g |
| Ceramic Hollow Microsphere SF14 | — | — | — | 16 g | — |

Each of the above compositions were coated onto a release film and dried at 70° C. in an oven with forced air circulation for 20 minutes and then in a vacuum oven at 70° C. for one hour. A 0.8mm thick, 20cm×20cm carrier layer was prepared by compression molding at about 110° C. using a stainless steel mold. A teflon FEP film was used to prevent the adhesive from sticking to the mold. The carrier layer was then electron beam irradiated both sides at 50 kGy using a 300 KeV ESI electron beam equipment. A high performance acrylic transfer tape AS 838X manufactured by Avery was then laminated on both sides of the carrier layer.

Composition 1 involved two different samples. Sample 1 was cured open face and sample 2 was cured two different samples. The skin layers of sample 2 had a coat weight of 125 G/m$^2$ rather than 50 g/m$^2$, as in Sample 1.

The dynamic mechanical properties of the tapes were evaluated using a Rheometrics dynamic mechanical spectrometer at 24° C. at a frequency range of 0.1-300 rad/sec.

PVC side molding test bars from Standard products were wiped clean with 1:1 dilution of isopropanol and distilled water and dried at room temperature. The moldings were then primed with Tite-R-Bond 2287 from Norton Chemical and dried at room temperature for 12 hours. One side of the double coated tape was laminated onto the smooth surface of the side molding using 6.8 Kg weighted roller Painted panels 51mm×127mm (Inmont base coat/clear coat) were cleaned using isopropanol/ distilled water as above and dried. The release film was removed and the molding was attached to the panel using a 6.8 Kg weighted roller (two passes) with 25.4mm of the molding overhanging the edge of the panel. All panels were aged at room temperature for 72 hours prior to an exposure or testing. Cleavage peels were determined similar to Fisher Body TM 45-88. Accelerated aging involved 2 weeks at 82° C. in an air oven. Humidity resistance was tested after exposing the panels with the side molding at 38° C. and 95% humidity for one week. Gasoline resistance was tested by immersing the samples into gasoline for 10 seconds and 20 seconds dry off time. This was repeated three times. Cleavage peel was determined immediately after the final immersion. Initial values indicate cleavage peels immediately after the specified exposure and Final values refer to cleavage peels after 24 hours conditioning at room temperature. Creep test involve laminating a 12.7mm×63.5mm side molding using a 6.8Kg weighted roller on a panel as in cleavage peel test with 12.7mm overhanging and attaching a 500g weight at the free end of the molding and immediately placing the sample in the oven for 96 hours at 70° C. Tensile strength and elongation at break were determined using a dumbell specimen similar to the ASTM D 1708.

The results are shown in Table II below. The results shown are an average of at least two duplicate tests.

TABLE VI

|  | Composition 1 | | | | Comp. 4 | | |
| --- | --- | --- | --- | --- | --- | --- | --- |
|  | Sample 1 | Sample 2 | Comp. 2 | Comp. 3 | Sample 1 | Sample 2 | Comp. 5 |
| CLEAVAGE PEEL | | | | | | | |
| BREAKAWAY | 121 ± 14 | 100 ± 14 | 82 ± 14 | 80 ± 14 | 86 | 70 | 74 |
| CONTINUOUS | 36 ± 7 | 38 ± 9 | 32 ± 9 | 30 ± 9 | 28 | 34 | 40 |
| ACCELERATED AGING | | | | | | | |
| INITIAL (N/12.7 MM) | | | | | | | |
| BREAKAWAY | 68 | 58 ± 14 | 50 ± 14 | 62 ± 14 | 92 | 56 | 76 |
| CONTINUOUS | 25 ± 7 | 40 ± 9 | 40 ± 9 | 30 ± 0 | 62 | 36 | 47 |
| FINAL (N/12.7 MM)* | | | | | | | |
| BREAKAWAY | 188 ± 14 | 153 ± 14 | 150 ± 14 | 132 ± 14 | 147 | 124 | 183 |
| CONTINUOUS | 62 ± 7 | 80 ± 9 | 60 ± 9 | 60 ± 9 | 89 | 75 | 84 |
| HUMIDITY | | | | | | | |
| INITIAL (N/12.7 MM) | | | | | | | |
| BREAKAWAY | 130 ± 14 | 98 ± 14 | 90 ± 14 | 100 ± 14 | 84 | 105 | 70 |
| CONTINUOUS | 63 ± 7 | 50 ± 9 | 50 ± 9 | 40 ± 9 | 40 | 43 | 40 |
| FINAL (N/12.5 MM)8* | | | | | | | |
| BREAKAWAY | 158 ± 14 | 115 ± 14 | 95 ± 14 | 95 ± 14 | 90 | 103 | 90 |
| CONTINUOUS | 70 ± 7 | 58 ± 9 | 50 ± 9 | 42 ± 9 | 48 | 50 | 50 |
| GASOLINE | | | | | | | |
| INITIAL (N/12.5 MM) | | | | | | | |
| BREAKAWAY | 130 ± 14 | 88 ± 14 | 95 ± 14 | 90 ± 14 | 74 | 83 | 77 |
| CONTINUOUS | 38 ± 7 | 38 ± 9 | 30 ± 9 | 30 ± 9 | 36 | 20 | 38 |
| CREEP (HRS) .70 DEG. C. | 166+ | 166+ | 166+ | 166+ | 95+ | 95+ | 95+ |
| THICKNESS (MIL) | 39 | 39 | 39 | 39 | 45 | 45 | 45 |
| TENSILE STRENGTH (kPa) | 900 | 900 | 900 | 900 | — | — | — |
| ELONGATION (%) | 700 | 700 | 700 | 700 | — | — | — |
| STORAGE MODULUS (G') (Pa) | | | | | | | |
| at 0.1 radians freq. | $1.5 \times 10^5$ | $1.5 \times 10^5$ | — | — | — | — | — |
| at 100 radians freq. | $9 \times 10^5$ | $9 \times 10^5$ | — | — | — | — | — |
| LOSS MODULUS (G") (Pa) | | | | | | | |
| at 0.1 radians freq. | $4 \times 10^4$ | $4 \times 10^4$ | — | — | — | — | — |
| at 100 radians freq. | $8 \times 10^5$ | $8 \times 10^5$ | — | — | — | — | — |

*Final values refer to the adhesion after recovering at 23° C. for 24 hours.

EXAMPLE II

A rubber based carrier layer was prepared by mixing as a solution in toluene at 50% by weight solids 90.4% by weight (dry weight) RB rubber based adhesive, 0.3% by weight trimethylolpropanetrithioglycolate (TMPTG), as a cross-linking additive and 9.3% by weight (32% by volume) hollow glass A-16-500 microspheres. The solvent was stripped off by vacuum and a 0.8 mm carrier layer was prepared by compression molding. A release liner, was used to prevent the carrier layer from sticking to the sides of the mold.

The rubber carrier layer thus prepared was electron beam irradiated on both sides at 300 kv, open faced under nitrogen. The process was repeated and a high performance rubber adhesive transfer tape was laminated on each side of the carrier layer to provide an adhesive coat weight of about 50 g/m² and electron beam irradiated at 50 kGy dose.

Tensile test specimens were cut out from the uncoated and double-coated samples and tested in a manner similar to the acrylic tapes of Example I. The results are shown in Tables III and IV below.

TABLE III
PROPERTIES OF UNCOATED
RUBBER-BASED CARRIER LAYER

| EB DOSE (kGy) | TENSILE STRENGTH (kPa) | ELONGATION (%) | 180° PEEL ON | |
| --- | --- | --- | --- | --- |
| | | | SS | PE |
| 0 | 1000 | 1700 | 2400 P | 1200 P |
| 30 | 1600 | 1600 | 1700 P | 1100 P |
| 50 | 1300 | 1200 | 1900 P | — |

TABLE IV
PROPERTIES OF DOUBLE-COATED
RUBBER-BASED TAPE

| EB DOSE (kGy) | TENSILE STRENGTH (kPa) | ELONGATION (%) | 180° PEEL ON | |
| --- | --- | --- | --- | --- |
| | | | SS | PE |
| 0 | 1300 | 1800 | >3900* | 2000 P |
| 30 | 1700 | 1900 | >3900* | 2300 P |
| 50 | 1500 | 1700 | >3900* | 2200 P |

P = CLEAN PANEL FAILURE
SS = STAINLESS STEEL
PE = POLYETHYLENE
*value at which the face stock aluminum tore

EXAMPLE III

A rubber-based composition was prepared as in Example II comprising 90.8% by weight (dry weight) RB adhesive, 3.6% by weight Q-cel 500 glass hollow microsphere, 1.8% by weight BJO 0930 hollow phenolic microspheres, 3.6% by weight Cab-O-Sil and 0.2% by weight Carbon Block, Monarch 700. The solvent was stripped off by vacuum and a 0.8 mm carrier layer was prepared by compression molding. A release liner, was used to prevent the carrier layer from sticking to the sides of the mold. The process was repeated and a high performance rubber adhesive transfer tape was laminated on each side of the carrier layer to provide an adhesive coat weight of about 50 g/m². Peel adhesive was measured after laminating one side of the tape to 0.127 mm Mylar.

The carrier layer by itself demonstrated a peel strength of 5300 N/m on a stainless steel substrate and 2960 N/m on a polyethylene substrate. The double coated tape exhibited a peel strength of 9400 N/m on a stainless steel substrate and 3130 N/m on a polyethylene substrate.

It is expected that the above samples could be formulated with 0.6% TMPTG for electron beam curing to improve high temperature performance without adversely affecting the above demonstrated peel strength.

EXAMPLE IV

A double-coated adhesive tape as prepared by dissolving a solution of Adhesive A in heptane/isopropanol alcohol (90:10) to provide a composition having 47.6% by weight solids. 137 grams of the composition was blended with 105 grams (37.2% by weight solids in heptane) of solids tacky microspheres prepared by the droplet suspension polymerization method disclosed in Example 2 of U.S. Pat. application Ser. No. 138,509. The mixture was coated onto a release liner to a thickness of about 5 mils. The solvents were then removed by drying the film in an oven at 70° C. for 20 minutes and then in a vacuum oven at 80° C. for 30 minutes. A one millimeter carrier sheet was prepared by compression molding the dried mixture between two teflon FEP film using a stainless steel plate in a hydraulic press at 100° C. The formed sheet was then irradiated at 50 KG eb dose using a 2.5 MeV electron beam device. A skin layer of adhesive was then laminated on each side of the carrier layer. The skin layer was made of Adhesive A containing 0.2% by weight glycidylmethacrylate comonomer and was applied in a thickness of 50 grams per square meter and was EB cured at 50 KGy dose.

The physical properties of the tape were then evaluated for side molding application and are shown in Table V below.

EXAMPLE V

Another double-coated foam tape was prepared by dissolving a solution of Adhesive A in heptane/isopropanol alcohol (90:10) to provide a composition comprising 47.6% by weight solids. 179 grams of the composition was blended with 80 grams (37.2% by weight solids in heptane) of solid, tacky microspheres prepared by the droplet suspension polymerication method of Example 2 of U.S. Pat. application Ser. No. 138,509. The solvents were removed by drying the mixture as a film in an oven at 70° C. for 20 minutes and then in a vacuum oven at 80° C. for 30 minutes. A one millimeter thick carrier sheet was prepared by compression molding the dry mixture between two teflon FEP films using a stainless steel plate in a hydraulic press at 100° C. The sheet was then irradiated at 50 KGy does using a 2.5 MeV electron beam device. A skin layer made of Adhesive A was laminated on both sides of the tape at a thickness of 50 grams per square meter.

The properties of the tape were evaluated for side molding application and are shown in Table V below. A cold slam test as described in FBMS 45-89 was also conducted. The tape passed the cold slam test at −20° C., with all test samples remaining on the panel after 10 slams. At −30° C., three out of four samples stayed on the panel after 10 slams.

TABLE V

| Example | 90° Peel Adhesion (N/M) | 72 Hrs. Rm Temp (N/12.7 mm) | | Gasoline (N/12.7 mm) | | Aging (N/12.7 mm) | | Creep |
|---|---|---|---|---|---|---|---|---|
| | | B | C | B | C | B | C | |
| A | 1370 P | 93 P | 45 P | 91 P | 46 P | 110 AD/F | 48 AD/F | 346 + Ks |
| B | 1200 P | 71 P | 36 P | 80 P | 38 P | 130 AD/F | 65 AD/F | 346 + Ks |

B = Breakaway
C = Continuous
P = Panel failure
AD/F = Adhesive failed from foam due to poor anchorage.

EXAMPLE VI

Figure 9:
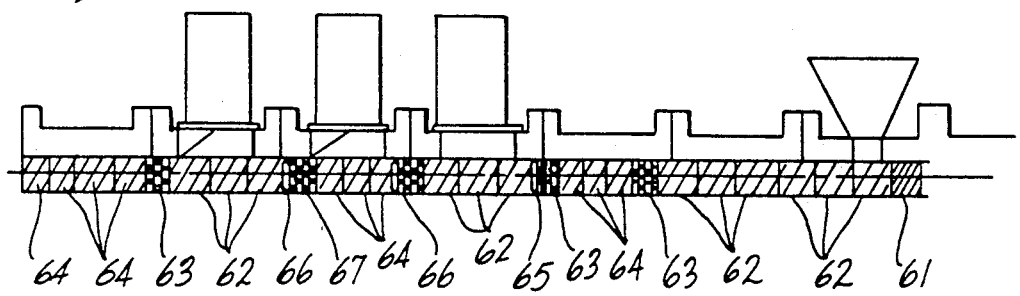
FIG. 9 is a schematic view of an extruder barrel showing a particular screw profile.

A sheet die was mounted on a ZE40-A,33L/D Berstorff extruder generally as shown in FIG. having seven barrel sections. A feed unit was mounted in the first section. The screw profile of the extruder is shown specifically in FIG. 9. Here screw element 61 is a return scroll. Screw elements 62 are three-flight conveying elements, specifically Berstorff No. 60-1-3. Screw elements 63 are mixing elements, specifically Berstorff No. ZS-10-12. Screw elements 64 are two-flight conveying elements, specifically Berstorff No. 40-1-2. Screw elements 65 and 66 are blisters, specifically Berstorff 39 and 42 respectively. Screw elements 67 are kneading elements, specifically Berstorff No. KS-9-RE.

The extruder was set up with three solvent removal units involving the fourth, fifth and sixth barrel sections respectively. Each barrel section had a large vent opening. An 1.5 to 2 inch duct connected each of the vent openings to a vacuum pump. An Ochsner vacuum pump with a suction capacity of 120 cc/hr was used in the first solvent removal unit to reduce the atmospheric pressure in the fifth barrel section and a Busch two-stage oil pump was used in the second and third solvent removal units to reduce the atmospheric pressure in the sixth and seventh barrel sections. Solvent removed by the solvent removal units were condensed and collected using a Busch condenser.

Trial runs involving three adhesive compositions were performed. Each had 63% solids, the remainder being ethylacetate solvent. The solids of the first composition consisted of Adhesive B adhesive only. The second consisted of 91% dry weight Adhesive B adhesive and 9% by weight hollow phenolic microspheres. The second composition was similar to the first except that the hollow microspheres were glass rather than phenolic.

In each trial, the adhesive composition was heated to a temperature of about 60° C. and gravity fed through a two-inch pipe into the hopper of the extruder feed unit. This produced a feed rate and production rate of up to about 32 lb/hr. The temperature of the first barrel section or feed zone was about 100° C. The temperature of the second and third barrel sections was also about 100° C. The temperature of the fourth, fifth and sixth barrel sections was from about 120 to about 150° C. The die temperature was from about 120 to about 140° C. and the melt temperature was about 124° C. to about 140° C. The extruder drive was operated at 70 to 214 rpm. The vacuum pumps maintained an atmospheric pressure in all three solvent removal units of approximately 70 torr. Approximately 80% by volume of the solvent was removed by the first solvent removal unit. Approximately 18% to 19% by volume of the solvent was removed by the second solvent removal unit and approximately 1% to 2% by volume of the solvent was removed by the third solvent removal unit. The amount of residual solvent remaining in all of the compositions was less than about 1%. The amount of residual free-monomer was found to be less than 0.1%.

EXAMPLE VII

Figure 10:
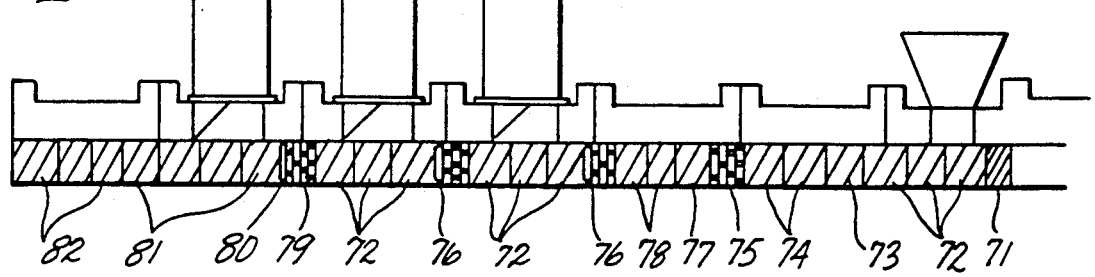
FIG. 10 is a schematic view of an extruder barrel showing another particular screw profile.

A 750 millimeter sheeting die was fitted onto a Berstorff 90 millimeter corotating twin screw extruder. The extruder had seven barrel sections. A feed unit was mounted on the first barrel section. The screw profile of the extruder is shown schematically in FIG. 10. Here, screw element 71 is a return scroll. Screw elements 72 are triple flight conveying elements, specifically Berstorff No. 125-1-3. Screw element 73 is a single flight conveying element, specifically Berstorff No. 125-1-S. Screw elements 74 area double flight conveying elements, specifically Berstorff No. 125-1-2. Screw elements 75 are mixing elements, specifically Berstorff No. ZS-15-25. Screw elements 76 are blisters, specifically Berstorff Blister 88. Screw element 77 is a single flight conveying element, specifically Berstorff No. 100-1-S and screw elements 78 are double flight conveying elements, specifically Berstorff No. 100-1-2. Screw elements 79 and 80 are kneading elements, specifically Berstorff Nos. KS-23-RE and A-KS-23-RE. Finally, screw elements 81 and 82 are double flight conveying elements, specifically Berstorff Nos. A-125-1-2 and A-100-2 respectively.

Three solvent removal units were set up involving the fourth, fifth and sixth barrel sections, each having a large vent opening. A two inch diameter duct connected each barrel section of a solvent removal unit with a vacuum pump. A 25 horsepower liquid ring pump used to reduce the atmospheric pressure in all three barrel sections of the solvent removal units. Solvent removed by the solvent removal units was condensed and collected using a condenser.

Trial runs were performed involving three adhesive compositions. All three compositions had 62% solids, i.e., 38% by volume solvent which was ethylacetate, etc. The solids of the fist adhesive composition consisted of Adhesive A adhesive only. The solids of the second adhesive composition consisted of 91% dry weight Adhesive A, 5.4% by weight Q-Cel 500 hollow glass microspheres and 3.6% by weight Cab-O-Sil M5 fumed silica. The solids of the third composition consisted of 91% dry weight Adhesive A, 54% by weight, Q-Cel 500 hollow glass microspheres, 3.2% by weight Cab-O-Cel M5 and 0.4% by weight carbon black monarch 500.

For the second and third compositions above, the fillers were pre-blended and fed simultaneously with the adhesive diluted with solvent to the feed unit of the extruder. The fillers were fed by an Acrison Volumetric Feeder, and the diluted adhesive was fed by gravity from two drums.

The temperature of the feed zone (first barrel section) was maintained at 58 to 67° C.; the second section at 84 to 123° C.; the third section at 100 to 153° C.; the fourth section at 100 to 155° C.; the fifth section at 104 to 148° C.; and the sixth section at 144 to 154° C. The die temperature was 107 to 165° C. and the melt temperature was 107 to 157° C. The extruder drive was operated at 100 to 120 rpm. The output ranged from 60 to 150 lbs/hr.

As the adhesive composition was conveyed through the extruder, approximately 80% of the solvent was removed in the first solvent removal unit, approximately 12% removed in the second solvent removal unit, and 1% removed in the third solvent removal unit.

Adhesive sheet material was extruded as a sheet approximately 22 inches wide and 20 to 70 mil thick. The sheet was extruded onto an FEP release film.

EXAMPLE VIII

A ZE90/90A Berstorff corotating twin screw extruder was set up a described in Example VII with a feed unit at the first barrel section and solvent removal units at the fourth, fifth and sixth barrel sections. A ZE40/40A Berstorff corotating twin screw extruder as described in Example 1 and having approximately 1/10 the capacity of the ZE90/90A extruder was set up at a right angle to the ZE90/90A extruder. The ZE40/40A extruder had a feed unit at the first barrel sections but only two solvent removal units, involving the fourth and fifth barrel sections. The ZE40/40A extruder was joined to the ZE90/90A extruder by an adapter generally as shown in FIG. 5.

A first composition was prepared comprising 53% solids including 91% dry weight Adhesive A adhesive, 5.4% by weight glass microspheres and 3.6% by weight fumed silica. The solvent was a 20:80 mixture of isopropanol and ethyl acetate. A second composition was prepared having 53% solids, the solids comprising Adhesive A adhesive only and the solvent comprising a 20:80 mixture of isopropanol and ethyl acetate.

The first composition was introduced into the ZE90/90A extruder and the second composition was introduced into the ZE40/40A extruder. The ZE90/90A extruder was driven at 140 rpm and the temperature in the second through seventh barrel sections was 102° C., 102° C., 129° C., 131° C., 122° C. and 118° C., respectively. The die temperature was 116° C. and the melt temperature was 117° C. The ZE40/40A extruder was driven at 197 rpm and the temperatures of the second through seventh barrel sections was 100° C., 100° C., 120° C., 147° C., 186° C. and 148° C. The melt temperature was 135° C. The solvent removal units for both extruders was maintained at 120 millibar.

From this arrangement, a double-coated PSA foam tape was co-extruded at a 200 lb./hr. rate, 20 lb./hr. from the ZE40/40A extruder. The product had a middle foam layer of the first composition and skin layers of the second composition. The amount of residual solvents in the product was less than 0.1%.

What is claimed is:

1. A pressure sensitive adhesive tape having a carrier layer comprising an electron beam-cured pressure sensitive adhesive polymer matrix, form about 5% to about 70% by volume low density microspheres and at least one ultraviolet light absorbable pigment in an amount of at least 0.2 percent by weight, wherein the pressure sensitive adhesive tape exhibits substantially no decrease in creep as compared to the same pressure sensitive adhesive tape without pigment.

2. An adhesive tape as claimed in claim 1 wherein the pressure sensitive adhesive polymer matrix is acrylic based and the creep at 70° C. is at least about 166 hours.

3. An adhesive tape as claimed in claim 1, wherein the carrier layer has a thickness of from about 0.25 to about 4.0 mm.

4. An adhesive tape as claimed in claim 1, wherein the carrier layer comprises from about 5% to about 45% by volume low density microspheres.

5. An adhesive tape as claimed in claim 1, wherein the carrier layer comprises from about 10 to about 20% by volume low density microspheres.

6. An adhesive tape as claimed in claim 1, wherein the low density microspheres are hollow.

7. An adhesive tape as claimed in claim 1, wherein the low density microspheres are made from a material selected from the group consisting of glass, ceramic, polymeric and carbon materials and mixtures thereof.

8. An adhesive tape as claimed in claim 7, wherein the low density microspheres are ceramic.

9. An adhesive tape as claimed in claim 7, wherein the low density microspheres are carbon.

10. An adhesive tape as claimed in claim 7, wherein the low density microspheres are made of a polymeric material.

11. An adhesive tape as claimed in claim 10, wherein the polymeric material is selected from the group of phenolic polymers and PVDC copolymers.

12. An adhesive tape as claimed in claim 10, wherein the polymeric material is an inherently tacky, infusible, pressure sensitive adhesive polymer.

13. An adhesive tape as claimed in claim 1, wherein the pigment is carbon black.

14. An adhesive tape as claimed in claim 13, wherein the carbon black is present in an amount of 0.25% to about 5% by weight.

15. An adhesive tape as claimed in claim 1, wherein the carrier layer further comprises fumed silica in an amount of up to about 10% by weight.

16. An adhesive tape as claimed in claim 15, wherein the fumed silica is present in the carrier layer in an amount of from about 3 to about 5% by weight.

17. An adhesive tape as claimed in claim 1, wherein the carrier layer further comprises up to about 5% by weight small, rigid high density, solid microspheres having a density of more than about 1.0 g/cc and an average diameter of less than about 10 microns.

18. An adhesive tape as claimed in claim 17, wherein the small, rigid high density, solid microspheres have an average diameter of from about 0.1 to about 5 microns.

19. An adhesive tape as claimed in claim 1, wherein the carrier layer has an elongation of at least about 500 percent and a tensile strength of at least 0.5 to 1.3 megapascals.

20. An adhesive tape as claimed in claim 1, wherein the carrier layer has a storage modulus of at least about $10^4$ pascals at 0.01 radians frequency and no more than about $5 \times 10^6$ pascals at 100 radians frequency and a loss modulus of at least $10^4$ pascals at 0.01 radians frequency and no more than about $5 \times 10^6$ pascals at 100 radians frequency.

21. An adhesive tape as claimed in claim 14, wherein the carrier layer has a storage modulus of at least $4 \times 10^4$ pascals at 0.01 radians frequency and no more than about $2 \times 10^6$ pascals at 100 radians frequency and a loss modulus of at least about $2 \times 10^4$ pascals at 0.01 radians frequency and at least about $2 \times 10^6$ pascals at 100 radians frequency.

22. An adhesive tape as claimed in claim 2, wherein the peel adhesion is from about 1300 to about 3000 newtons/meter.

23. An adhesive tape as claimed in claim 1, wherein the pressure sensitive adhesive polymer matrix is rubber based.

24. An adhesive tape as claimed in claim 23, wherein the peel adhesion is at least about 3000 newtons/meter.

25. An adhesive tape as claimed in claim 24 wherein the peel adhesion is at least about 9000 newtons/meter.

26. An adhesive tape as claimed in claim 1, further comprising a skin layer coated on to at least one side of the carrier layer, said skin layer comprising an adhesive polymer matrix substantially free of low density microspheres.

27. An adhesive tape as claimed in claim 26, wherein the skin layer has a coating thickness of from about 25 to about 125 grams/m$^2$.

28. An adhesive tape as claimed in claim 1 further comprising a skin layer coated onto at least one side of the carrier layer, said skin layer comprising a heat activatable adhesive substantially free of rigid, low density microspheres.

29. A pressure sensitive adhesive tape comprising a carrier layer having a thickness of from about 0.25 to about 4.0 millimeters and a skin layer having a coating thickness of at least about 25 g/m$^2$ on at least one side of the carrier layer, said carrier layer comprising a cross-linked polymer matrix, from about 5% to about 70% by volume low density microspheres and a colored pigment in an amount of from 0.25% to about 5% by weight, said skin layer comprising a pressure sensitive adhesive polymer matrix substantially free of rigid, low density microspheres, wherein the pressure sensitive adhesive tape exhibits substantially no decrease in creep as compared to the same pressure sensitive adhesive tape without pigment.

30. A pressure sensitive adhesive tape as claimed in claim 29, wherein the carrier layer comprises from about 10 to about 45% by volume low density microspheres.

31. A pressure sensitive adhesive tape as claimed in claim 29, wherein the carrier layer further comprises fumed silica in an amount of up to about 10% by weight.

32. A pressure sensitive adhesive tape as claimed in claim 31, wherein the fumed silica is present in the carrier layer of an amount of from about 3 to about 5% by weight.

33. A pressure sensitive adhesive tape as claimed in claim 29, wherein said tape has an elongation of at least about 300%, a tensile strength of at least 0.5 megapascals, a storage modulus of at least about $10^4$ pascals at 0.01 radians frequency and no more than about $2 \times 10^6$ pascals at 100 radians frequency and a loss modulus of at least $10^4$ pascals at 0.01 radians frequency and no more than about $2 \times 10^6$ pascals at 100 radians frequency.

34. A pressure sensitive adhesive tape as claimed in claim 33, wherein the tape has a storage modulus of at least $4 \times 10^4$ pascals at 0.01 radians frequency and no more than about $2 \times 10^6$ pascals at 100 radians frequency and a loss modulus of at least about $2 \times 10^4$ pascals at 0.01 radians frequency and no more than about $2 \times 10^6$ pascals at 100 radians frequency.

35. A pressure sensitive adhesive tape as claimed in claim 29 wherein the polymer matrix is a pressure sensitive adhesive polymer matrix.

36. A pressure sensitive adhesive tape as claimed in claim 35, wherein the pressure sensitive adhesive polymer matrix is acrylic based and the peel adhesion is from about 1300 to about 3000 newtons/meter.

37. A pressure sensitive adhesive tape as claimed in claim 35, wherein the pressure sensitive adhesive polymer matrix is rubber based and the peel adhesion is at least about 3000 newtons/meter.

38. A pressure sensitive adhesive tape as claimed in claim 37 wherein the peel adhesion is at least about 9000 newtons/meter.

39. A pressure sensitive adhesive tape comprising a carrier layer having a thickness of from about 0.25% to about 4.0 millimeters and a skin layer having a coating thickness of at least about 25 g/m$^2$ on each side of the carrie layer, said carrier layer comprising an electron beam-cured pressure sensitive adhesive polymer matrix, from about 10% to about 70% by volume low density microspheres selected from the group consisting of glass, ceramic, polymeric and carbon materials and mixtures thereof, a pigment in an amount of from 0.25% to about 5% by weight, and wherein said skin layer comprises a pressure sensitive adhesive matrix substantially free of rigid, low density microspheres, wherein the pressure sensitive adhesive tape exhibits substantially no decrease in creep as compared to the same pressure sensitive adhesive tape without pigment.

40. A pressure sensitive adhesive tape as claimed in claim 36, wherein the low density microspheres are ceramic.

41. A pressure sensitive adhesive tape as claimed in claim 36, wherein the low density microspheres are carbon.

42. A pressure sensitive adhesive tape as claimed in claim 39, wherein the low density microspheres are made of a polymeric material.

43. A pressure sensitive adhesive tape as claimed in claim 42, wherein the polymeric material is selected from the group of phenolic polymers and PVDC copolymers.

44. A pressure sensitive adhesive tape as claimed in claim 42, wherein the polymeric material is an inherently tacky, infusible, pressure sensitive adhesive polymer.

* * * * *

UNITED STATES PATENT AND TRADEMARK OFFICE
CERTIFICATE OF CORRECTION

PATENT NO. : 5,100,728

DATED : March 31, 1992

INVENTOR(S) : S.S. Plamthottam; E.W. McFeaters; Y. Ozari; P. Mallya

It is certified that error appears in the above-identified patent and that said Letters Patent is hereby corrected as shown below:

On the Front Page

Abstract, line 8, change "kin" to -- skin --.

In the Specification

Column 2, line 11, change "cross-likined" to
    -- cross-linked --.
Column 15, line 2, before "laminating" insert -- after --.
Column 16, line 24, before "two" insert -- through a FEP
    release film, composition 4 also involved --.
Column 18, line 55, change "Carbon Block" to
    -- Carbon Black --.
Column 19, line 20, after "tape" change "as" to -- is --.
Column 19, line 54, change "polymerication" to
    -- polymerization --.
Column 19, line 62, change "does" to -- doses --.
Column 20, line 20, after "FIG." insert -- 1 --.
Column 21, line 39, after "pump" insert -- was --.
Column 21, line 46, change "fist" to -- first --.
Column 21, line 52, change "54%" to -- 5.4% --.
Column 22, line 14, before "described" change "a" to -- as --.

UNITED STATES PATENT AND TRADEMARK OFFICE
CERTIFICATE OF CORRECTION

PATENT NO. : 5,100,728
DATED : March 31, 1992
INVENTOR(S) : S.S. Plamthottam; E.W. McFeaters; Y. Ozari; P. Mallya It is certified that error appears in the above-identified patent and that said Letters Patent is hereby corrected as shown below:

In the Claims

Column 22, line 56, change "form" to -- from --.
Column 23, line 29, before "0.25%" insert -- from --.
Column 25, line 7, change "0.25%" to -- 0.25 --.
Column 25, line 10, change "carrie" to -- carrier --.

Signed and Sealed this

Tenth Day of August, 1993

Attest:

MICHAEL K. KIRK

Attesting Officer

Acting Commissioner of Patents and Trademarks